US011289782B2

(12) United States Patent
Guen

(10) Patent No.: US 11,289,782 B2
(45) Date of Patent: Mar. 29, 2022

(54) SECONDARY BATTERY

(71) Applicant: SAMSUNG SDI CO., LTD., Yongin-si (KR)

(72) Inventor: Min Hyung Guen, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 117 days.

(21) Appl. No.: 16/566,664

(22) Filed: Sep. 10, 2019

(65) Prior Publication Data
US 2020/0091492 A1 Mar. 19, 2020

(30) Foreign Application Priority Data
Sep. 19, 2018 (KR) .................. 10-2018-0112320

(51) Int. Cl.
H01M 50/543 (2021.01)
H01M 50/172 (2021.01)
H01M 50/581 (2021.01)
H01M 50/30 (2021.01)
H01M 50/116 (2021.01)
H01M 50/502 (2021.01)

(52) U.S. Cl.
CPC ....... *H01M 50/543* (2021.01); *H01M 50/116* (2021.01); *H01M 50/172* (2021.01); *H01M 50/30* (2021.01); *H01M 50/502* (2021.01); *H01M 50/581* (2021.01); *H01M 2200/103* (2013.01)

(58) Field of Classification Search
CPC ........ H01M 2/30; H01M 2/0277; H01M 2/06; H01M 2/12; H01M 2/202; H01M 2/348; H01M 2200/103; H01M 50/502; H01M 50/543–567

USPC .......................................................... 429/61
See application file for complete search history.

(56) References Cited

U.S. PATENT DOCUMENTS

| 9,190,636 | B2 * | 11/2015 | Kim | ........................ | H01M 2/06 |
| 9,287,549 | B2 * | 3/2016 | Kim | .................... | H01M 50/543 |
| 9,692,037 | B2 | 6/2017 | Jang et al. | | |
| 10,128,484 | B2 | 11/2018 | Kim | | |
| 10,276,854 | B2 | 4/2019 | Koo | | |
| 2012/0196166 | A1 * | 8/2012 | Kim | ........................ | H01M 2/22 |
| | | | | | 429/94 |

(Continued)

FOREIGN PATENT DOCUMENTS

| JP | 2017139079 A | * | 8/2017 | ............. | H01M 2/06 |
| KR | 10-2016-0106427 A | | 9/2016 | | |

(Continued)

*Primary Examiner* — Bethany L Martin
*Assistant Examiner* — Kourtney R S Carlson
(74) *Attorney, Agent, or Firm* — Lewis Roca Rothgerber Christie LLP

(57) ABSTRACT

A secondary battery includes an electrode assembly; a case accommodating the electrode assembly; a cap plate coupled to a top portion of the case; an electrode terminal electrically connected to the electrode assembly and including a terminal pillar passing through the cap plate, and an extension part extending horizontally from a top end of the terminal pillar; a terminal plate electrically connected to the electrode terminal; an insulation member between the terminal plate and the cap plate; and a fuse part defined by a portion of the extension part and the terminal plate that are welded to each other and located on the insulation member.

9 Claims, 5 Drawing Sheets

(56) References Cited

U.S. PATENT DOCUMENTS

| | | | |
|---|---|---|---|
| 2013/0337295 A1* | 12/2013 | Kim | H01M 2/266 |
| | | | 429/57 |
| 2014/0377601 A1 | 12/2014 | Kim | |
| 2016/0079571 A1* | 3/2016 | Seong | H01M 2/0202 |
| | | | 429/185 |
| 2016/0260956 A1 | 9/2016 | Jang et al. | |
| 2016/0276645 A1 | 9/2016 | Koo | |
| 2019/0027717 A1* | 1/2019 | Chen | H01M 50/581 |

FOREIGN PATENT DOCUMENTS

| | | |
|---|---|---|
| KR | 10-2016-0111155 A | 9/2016 |
| KR | 10-1696010 B | 1/2017 |

\* cited by examiner

SECONDARY BATTERY

CROSS-REFERENCE TO RELATED APPLICATION

This application claims priority to and the benefit of Korean Patent Application No. 10-2018-0112320, filed on Sep. 19, 2018 in the Korean Intellectual Property Office, the entire content of which is herein incorporated by reference.

BACKGROUND

1. Field

Aspects of embodiments of the present invention relate to a secondary battery.

2. Description of the Related Art

Unlike a primary battery that is not rechargeable, a secondary battery can be repeatedly charged and discharged. A small-capacity secondary battery including a battery cell packaged in the form of a pack may be used for small portable electronic devices, such as mobile phones or camcorders, while a large-capacity secondary battery including tens of battery cells connected to one another may be used as a motor-driving power source, such as for a hybrid vehicle and the like.

Secondary batteries are manufactured in various shapes, such as a cylindrical shape, a prismatic shape, or a pouch-like shape. An example secondary battery may be constructed by inserting an electrolyte and an electrode assembly formed by placing a separator as an insulator between a positive electrode plate and a negative electrode plate in a battery case, and coupling a cap plate to the battery case.

Meanwhile, if an overcharge or an internal or external short circuit occurs to the secondary battery, excessive heat may be generated or the internal pressure of the battery may rise, resulting in explosion or fire. Accordingly, there is a need for a secondary battery configured to improve safety.

The above information disclosed in this Background section is only for enhancement of understanding of the background of the described technology and, therefore, it may contain information that does not form the prior art that is already known in this country to a person of ordinary skill in the art.

SUMMARY

According to an aspect of embodiments of the present invention, a secondary battery having improved safety is provided.

According to one or more embodiments of the present invention, a secondary battery includes: an electrode assembly; a case accommodating the electrode assembly; a cap plate coupled to a top portion of the case; an electrode terminal electrically connected to the electrode assembly and including a terminal pillar passing through the cap plate, and an extension part extending horizontally from a top end of the terminal pillar; a terminal plate electrically connected to the electrode terminal; an insulation member between the terminal plate and the cap plate; and a fuse part defined by a portion of the extension part and the terminal plate that are welded to each other and located on the insulation member.

The terminal plate may include a first area located at a center of the terminal plate and welded to the extension part, and a second area located outside the first area and having a thickness greater than a thickness of the first area.

The thickness of the first area may be the same as a thickness of the extension part.

The first area may have a hole through which the electrode terminal passes, and a width of the hole may be the same as a width of the extension part.

A portion of the terminal pillar, which protrudes to an upper portion of the cap plate, may contact the insulation member.

The extension part may extend to an upper portion of the insulation member.

The secondary battery may further include a gasket coupled between the terminal pillar and the cap plate under the cap plate.

The secondary battery may further include a connection plate electrically connected to the terminal plate, and a bus bar electrically connected to the connection plate.

The connection plate may include a terminal connection portion electrically connected to the second area, a bus bar connection portion electrically connected to the bus bar, and a vent portion between the terminal connection portion and the bus bar connection portion.

The vent portion may be on the insulation member.

As described above, the secondary battery according to one or more embodiments of the present invention includes the fuse part formed by welding the first electrode terminal and the first terminal plate and located on the first insulation member. When an external short circuit occurs, the fuse part is melted and cut to then cut off an electrical connection between the first electrode terminal and the first terminal plate, thereby improving the safety of the secondary battery.

DETAILED DESCRIPTION

Figure 1:
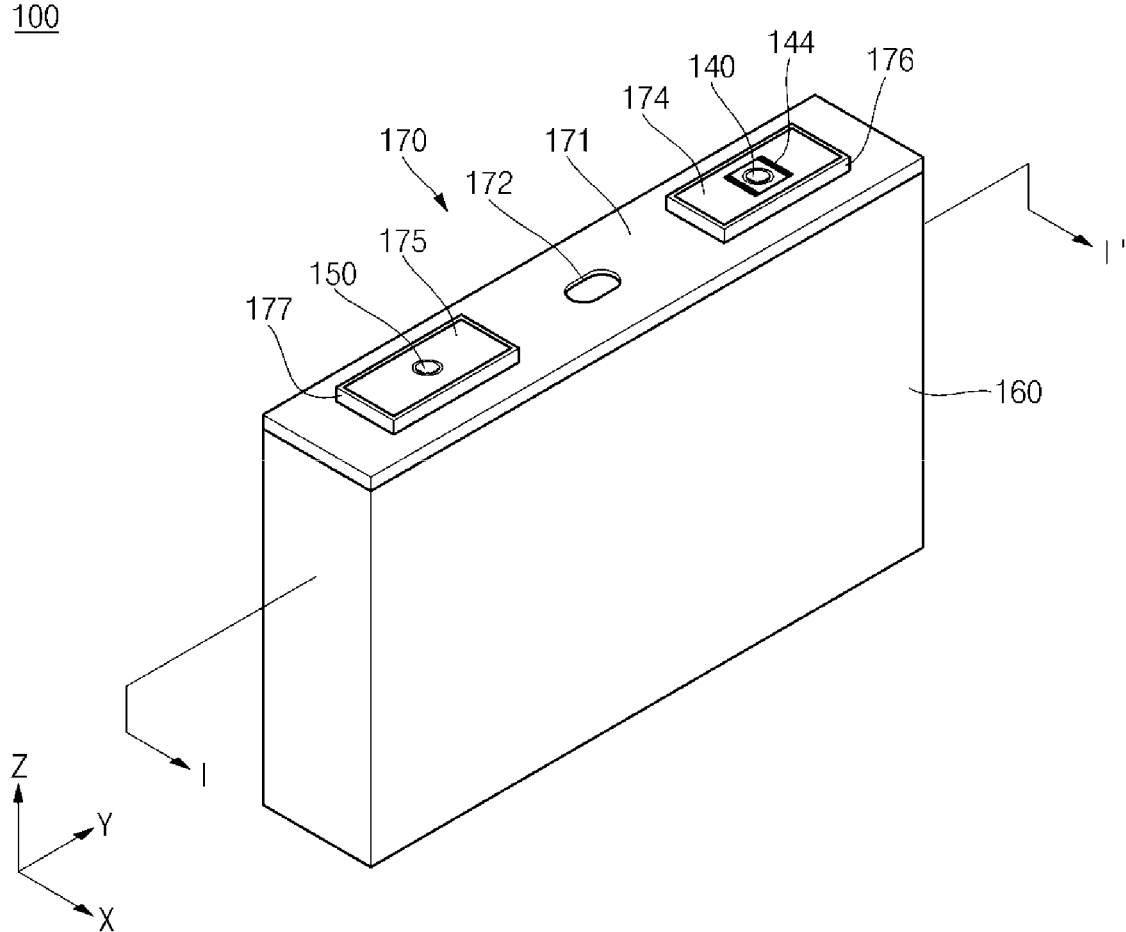
FIG. 1 is a perspective view of a secondary battery according to an embodiment of the present invention.

Herein, some example embodiments of the present invention will be described in further detail.

Various embodiments of the present invention may be embodied in many different forms and should not be construed as being limited to the example embodiments set forth herein. Rather, these example embodiments of the disclosure are provided so that this disclosure will be thorough and complete and will convey inventive concepts of the disclosure to those skilled in the art.

In addition, in the accompanying drawings, sizes or thicknesses of various components may be exaggerated for brevity and clarity. Like numbers refer to like elements throughout. As used herein, the term "and/or" includes any and all combinations of one or more of the associated listed items.

It is to be understood that although the terms "first," "second," etc. may be used herein to describe various components, these components should not be limited by these terms.

An expression used in the singular encompasses the expression of the plural, unless it has a clearly different meaning in the context.

It is to be further understood that the terms "comprises" and/or "comprising" used herein specify the presence of stated features or components, but do not preclude the presence or addition of one or more other features or components.

It is to be understood that when a layer, region, or component is referred to as being "formed on" another layer, region, or component, it may be directly or indirectly formed on the other layer, region, or component. That is, for example, one or more intervening layers, regions, or components may be present.

Spatially relative terms, such as "beneath," "below," "lower," "above," "upper," and the like, may be used herein for ease of description to describe one element or feature's relationship to another element(s) or feature(s) as illustrated in the figures. It is to be understood that the spatially relative terms are intended to encompass different orientations of the device in use or operation in addition to the orientation depicted in the figures. For example, if the device in the figures is turned over, elements described as "below" or "beneath" other elements or features would then be oriented "on" or "above" the other elements or features. Thus, the exemplary term "below" can encompass both an orientation of above and below.

When a certain embodiment may be implemented differently, a specific process order may be performed differently from the described order. For example, two consecutively described processes may be performed substantially at the same time or performed in an order opposite to the described order.

It is to be understood that when a layer, region, or component is connected to another portion, the layer, region, or component may be directly connected to the portion or one or more intervening layers, regions, or components may exist. For example, when a layer, region, or component is electrically connected to another portion, the layer, region, or component may be directly electrically connected to the portion or may be indirectly connected to the portion through another layer, region, or component.

Unless otherwise defined, all terms (including technical and scientific terms) used herein have the same meaning as commonly understood by one of ordinary skill in the art to which example embodiments of the inventive concept belong. It is to be further understood that terms, such as those defined in commonly-used dictionaries, should be interpreted as having a meaning that is consistent with their meaning in the context of the relevant art and will not be interpreted in an idealized or overly formal sense unless expressly so defined herein.

Figure 2:
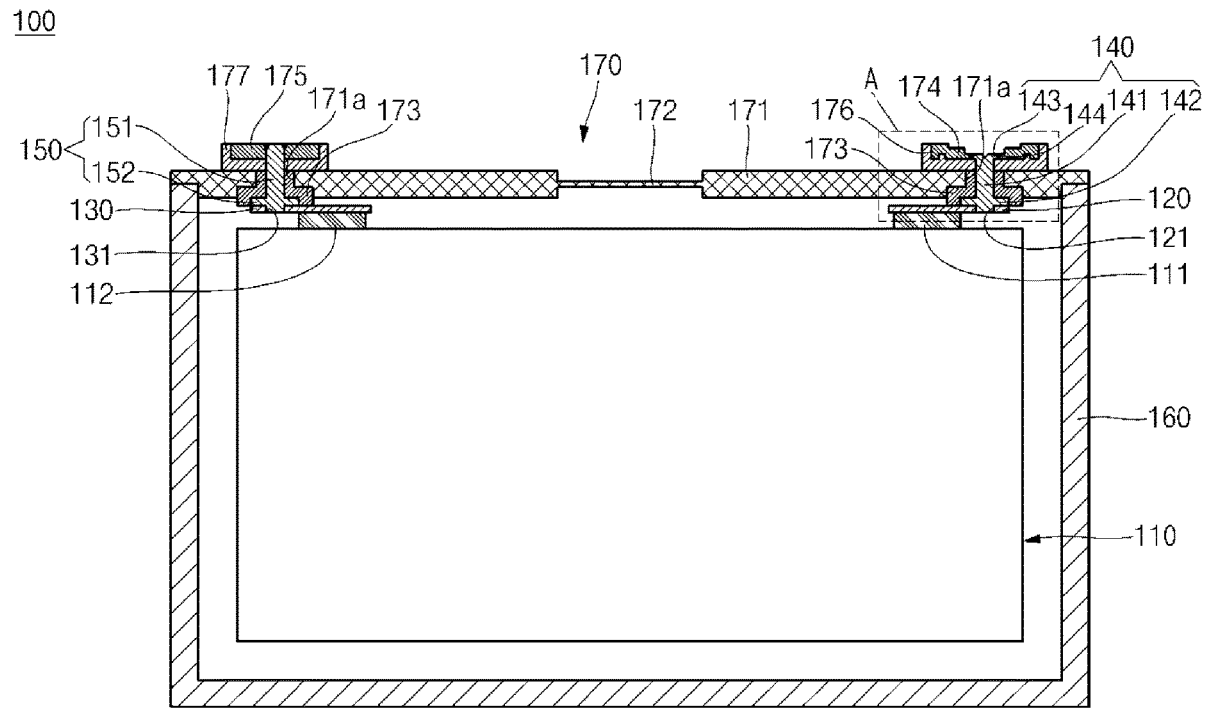
FIG. 2 is a cross-sectional view of the secondary battery of FIG. 1, taken along the line I-I'.

FIG. 1 is a perspective view of a secondary battery according to an embodiment of the present invention; FIG. 2 is a cross-sectional view of the secondary battery of FIG. 1, taken along the line I-I'; and FIG. 3 is an enlarged view of a region "A" shown in FIG. 2.

Figure 3:
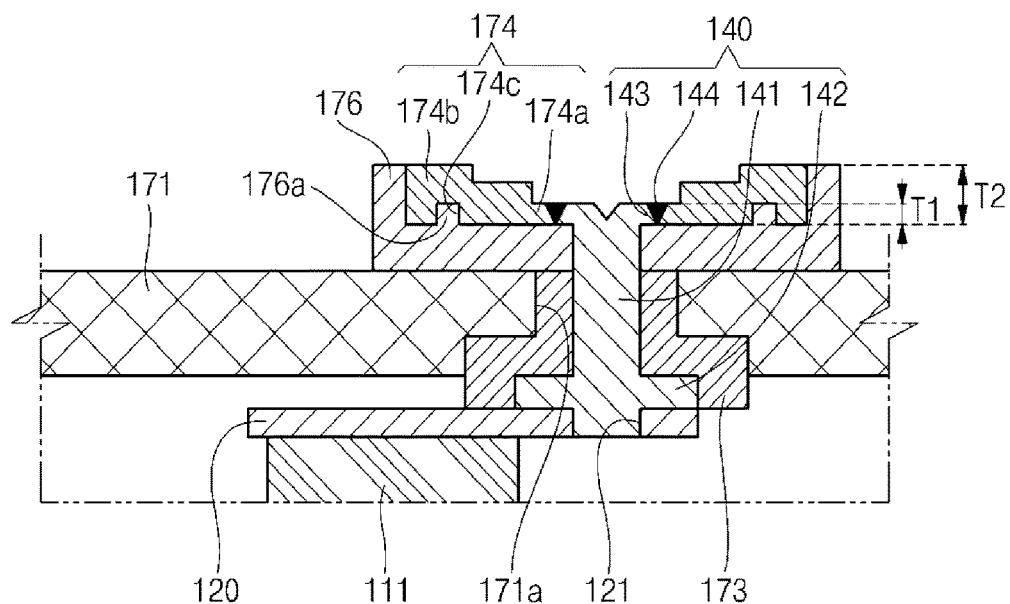
FIG. 3 is an enlarged view of a region "A" shown in FIG. 2.

Referring to FIGS. 1 to 3, a secondary battery 100 according to an embodiment of the present invention includes an electrode assembly 110, a first collector plate 120, a second collector plate 130, a first electrode terminal 140, a second electrode terminal 150, a case 160, and a cap assembly 170.

The electrode assembly 110 is formed by winding or stacking a stacked structure including a first electrode plate, a separator, and a second electrode plate, which are shaped of thin plates or layers. Here, the first electrode plate may serve as a positive electrode, and the second electrode plate may serve as a negative electrode. Of course, polarities of the first electrode plate and the second electrode plate may be reversed according to the choice made by one skilled in the art.

The first electrode plate is formed by coating a first electrode active material, such as a transition metal oxide, on a first electrode collector made of a metal foil, such as aluminum, and includes a first electrode uncoated portion on which the first electrode active material is not coated. In addition, a first current collector tab 111 may be made from the first electrode uncoated portion. The first current collector tab 111 may protrude at an upper portion of the electrode assembly 110. In an embodiment, when the first electrode plate is wound, the first current collector tab 111 may be configured to overlap at a certain position, providing a multi-tab structure. In an embodiment, when multiple first electrode plates are stacked, the first current collector tabs 111 may be configured to overlap at a same position, providing a multi-tab structure.

The second electrode plate is formed by coating a second electrode active material, such as graphite or carbon, on a second electrode collector made of a metal foil, such as copper or nickel, and includes a second electrode uncoated portion on which the second electrode active material is not coated. In addition, a second current collector tab 112 may be made from the second electrode uncoated portion. The second current collector tab 112 may protrude at the upper portion of the electrode assembly 110. In an embodiment, when the second electrode plate is wound, the second current collector tab 112 may be configured to overlap at a given position, providing a multi-tab structure. In an embodiment, when multiple second electrode plates are stacked, the second current collector tabs 112 may be configured to overlap at a same position, providing a multi-tab structure.

The separator, positioned between the first and second electrodes, prevents or substantially prevents an electrical short circuit therebetween and allows movement of lithium ions. In an embodiment, the separator may be made of polyethylene, polypropylene, or a composite film of polyethylene and polypropylene.

In addition, the electrode assembly 110 is substantially accommodated in the case 160 with an electrolyte. Here, at least one or more electrode assemblies 110 may be accommodated in the case 160. The electrolyte may include an organic solvent, such as ethylene carbonate (EC), propylene carbonate (PC), diethyl carbonate (DEC), ethyl methyl carbonate (EMC), or dimethyl carbonate (DMC), and a lithium salt, such as $LiPF_6$, or $LiBF_4$. In addition, the electrolyte may be in a liquid, solid, or gel phase. In addition, the first current collector tab 111 and the second current collector tab 112 are electrically connected to the first collector plate 120 and the second collector plate 130, respectively.

The first collector plate 120 is positioned on the electrode assembly 110 and is electrically connected to the first current collector tab 111 and the first electrode terminal 140. In further detail, the first current collector tab 111 is connected to a side of the first collector plate 120, and the first electrode terminal 140 is connected to another side of the first collector plate 120. In an embodiment, the first current collector tab 111 is welded to a side of the first collector plate 120. In an embodiment, the first current collector tab 111 protruding at the upper portion of the electrode assembly 110 may be coupled to a bottom surface of the first collector plate 120 by ultrasonic welding, resistance welding, or laser welding. The first electrode terminal 140, which will later be described, is electrically connected to another side of the first collector plate 120. In an embodiment, a through hole 121 is located at the another side of the first collector plate 120, and the first electrode terminal 140 is coupled to the through hole 121 to then be fixed by welding. In another embodiment, the first electrode terminal 140 may come into contact with a top portion of the first collector plate 120 to then be fixed to the first collector plate 120 along its periphery using a welding process without forming a separate hole in the first collector plate 120.

The second collector plate 130 is positioned on the electrode assembly 110 and is electrically connected to the second current collector tab 112 and the second electrode terminal 150. In further detail, the second current collector tab 112 is connected to a side of the second collector plate 130, and the second electrode terminal 150 is connected to another side of the second collector plate 130. In an embodiment, the second current collector tab 112 is welded to the another side of the second collector plate 130. In an embodiment, the second current collector tab 112 protruding at the upper portion of the electrode assembly 110 may be coupled to a bottom surface of the second collector plate 130 by ultrasonic welding, resistance welding, or laser welding. The second electrode terminal 150, which will later be described, is electrically connected to the another side of the second collector plate 130. In an embodiment, a through hole 131 is located at the another side of the second collector plate 130, and the second electrode terminal 150 is coupled to the through hole 131 to then be fixed by welding. In another embodiment, the second electrode terminal 150 may come into contact with a top portion of the second collector plate 130 to then be fixed to the second collector plate 130 along its periphery using a welding process without forming a separate hole in the second collector plate 130.

The first electrode terminal 140 includes a terminal pillar 141, a flange 142, an extension part 143, and a fuse part 144.

The terminal pillar 141 passes through a cap plate 171 and protrudes to an upper portion of the cap plate 171. The flange 142 is located at a lower portion of the terminal pillar 141 and horizontally extends from the terminal pillar 141. The flange 142 functions to prevent or substantially prevent the first electrode terminal 140 from being dislodged from the cap plate 171. In addition, a portion of the terminal pillar 141, positioned under the flange 142, is coupled to the through hole 121 of the first collector plate 120 to electrically connect the first electrode terminal 140 and the first collector plate 120. The horizontally extending extension part 143 is located at the top end of the terminal pillar 141. The extension part 143 may be a portion extending when an upper portion of the terminal pillar 141 is riveted, or a portion that is intentionally made to extend when the first electrode terminal 140 is formed. The extension part 143 extends to an upper portion of a first insulation member 176 positioned between the cap plate 171 and a first terminal plate 174. The first terminal plate 174 is coupled to the first electrode terminal 140, and the extension part 143 is electrically connected to the first terminal plate 174 by welding. Here, a portion where the extension part 143 and the first terminal plate 174 are welded to each other may be defined as the fuse part 144. In an embodiment, the fuse part 144 may be formed by ultrasonic welding, resistance welding or laser welding. That is, the fuse part 144 may be formed by melting the extension part 143 of the first electrode terminal 140 and a portion of the first terminal plate 174. In an embodiment, only the extension part 143 of the first electrode terminal 140 is connected to the first terminal plate 174, and a remaining part of the first electrode terminal 140, including the terminal pillar 141 and the flange 142, may not come into direct contact with the first terminal plate 174 and/or the cap plate 171 by the first insulation member 176 and a gasket 173. Therefore, the fuse part 144 may be melted and cut by the heat generated when a large amount of current flows in the secondary battery 100 due to an external short circuit, thereby cutting off the flow of current.

The second electrode terminal 150 includes a terminal pillar 151 and a flange 152.

The terminal pillar 151 passes through the cap plate 171 and protrudes to the upper portion of the cap plate 171. In an embodiment, an upper portion of the terminal pillar 151 is riveted to then be fixed to the cap plate 171. The flange 152 is located at a lower portion of the terminal pillar 151 and horizontally extends from the terminal pillar 151. The flange 152 functions to prevent or substantially prevent the second electrode terminal 150 from being dislodged from the cap plate 171. In an embodiment, a portion of the terminal pillar 151, positioned under the flange 152, is coupled to a through hole 131 of the second collector plate 130 to electrically connect the second electrode terminal 150 and the second collector plate 130.

In an embodiment, the case 160 is made of a conductive metal, such as aluminum, an aluminum alloy, or nickel-plated steel, and may have an approximately hexahedral shape with an opening such that the electrode assembly 110 can be inserted and placed in the case 160. The cap plate 171 is coupled to the opening of the case 160 to seal the case 160. In an embodiment, the interior surface of the case 160 is subjected to insulation treatment to prevent or substantially prevent internal electrical short-circuits from occurring in the case 160. In an embodiment, one electrode of the electrode assembly 110 may be connected to the case 160 through the cap plate 171. In this case, the internal electrical short circuits can also be prevented or substantially prevented by the insulation treatment of the case 160.

The cap assembly 170 is coupled to a top portion (opening) of the case 160. In an embodiment, the cap assembly 170 includes the cap plate 171, a safety vent 172, the gasket 173, the first terminal plate 174, a second terminal plate 175, the first insulation member 176, and a second insulation member 177.

In an embodiment, the cap plate 171 shaped of a plate may seal the opening of the case 160 and may be made of a same material as the case 160. In an embodiment, the cap plate 171 may be coupled to the case 160 by laser welding. The cap plate 171 may be electrically independent or may be electrically connected to one of the first current collector tab 111 and the second current collector tab 112.

In an embodiment, the safety vent 172 having a smaller thickness than other regions is located roughly at the center of the cap plate 171. If the internal pressure of the case 160 is higher than a certain (e.g., preset) rupture pressure, the safety vent 172 may be ruptured to prevent or substantially prevent the secondary battery 100 according to an embodiment of the present invention from exploding. In addition, an injection hole (not shown) for injecting an electrolyte is located at a side of the cap plate 171 to inject the electrolyte into the case 160.

In addition, respective terminal holes 171a are located in the cap plate 171 to pass the first electrode terminal 140 and the second electrode terminal 150 therethrough. The respective gaskets 173 made of an insulating material are coupled to the terminal holes 171a. The respective gaskets 173 are coupled to the cap plate 171 from a bottom portion of the cap plate 171 to seal spaces between the first electrode terminal 140 and the cap plate 171 and between the second electrode terminal 150 and the cap plate 171. The gaskets 173 may prevent or substantially prevent external moisture from infiltrating into the secondary battery 100 or the electrolyte accommodated within the secondary battery 100 from flowing out from the secondary battery 100. In an embodiment, the gasket 173 electrically insulates the first electrode terminal 140 and the cap plate 171 from each other and the second electrode terminal 150 and the cap plate 171 from each other.

Figure 4A:
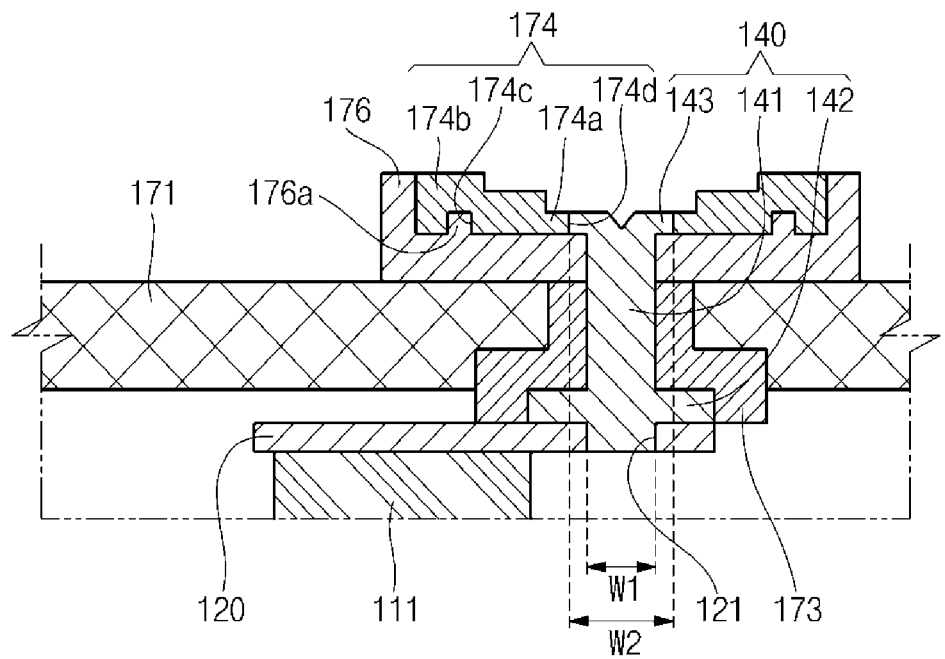
FIGS. 4A to 4C are cross-sectional views illustrating processes for preparing and operating a fuse part.

The first terminal plate 174 is coupled to the first electrode terminal 140 protruding to the upper portion of the cap plate 171 through the terminal hole 171a of the cap plate 171. In further detail, referring to FIG. 3, the first terminal plate 174 includes a first area 174a positioned at a center of the first terminal plate 174 and a second area 174b positioned at an outside of the first area 174a. In an embodiment, a thickness T1 of the first area 174a is smaller than a thickness T2 of the second area 174b. In an embodiment, the thickness T1 of the first area 174a is equal to a thickness of the extension part 143 of the first electrode terminal 140. In addition, as shown in FIG. 4A, a hole 174d engaged with the first electrode terminal 140 is located in the first area 174a. A width W2 of the hole 174d is larger than a width W1 of the terminal pillar 141 of the first electrode terminal 140 and is equal to a width of the extension part 143. In an embodiment, a top surface of the first area 174a is coplanar with a top surface of the extension part 143 of the first electrode terminal 140. In addition, boundary surfaces of the first area 174a and the extension part 143 are welded to form the fuse part 144. In this way, since the fuse part 144 is formed by welding the first area 174a and the extension part 143 having a relatively small thickness in the first terminal plate 174 and the first electrode terminal 140, respectively, it can be easily melted and cut in an event of an electrical short circuit of the secondary battery 100, thereby functioning as a fuse. If the fuse part 144 is cut in such a manner, an electrical connection between the first electrode terminal 140 and the first terminal plate 174 is broken, such that the first electrode terminal 140 and the first terminal plate 174 are maintained at an electrically disconnected state by the first insulation member 176. In an embodiment, a coupling groove 174c engaged with a coupling protrusion 176a of the first insulation member 176 is located in a bottom surface of the second area 174b.

The second terminal plate 175 is coupled to the second electrode terminal 150 protruding to the upper portion of the cap plate 171 through the terminal hole 171a of the cap plate 171. In an embodiment, the second terminal plate 175 is coupled to the second electrode terminal 150 and an upper portion of the second electrode terminal 150 is then riveted or welded, thereby fixing the second electrode terminal 150 to the second terminal plate 175. In addition, the second terminal plate 175 comes into contact with a portion of the terminal pillar 151 of the second electrode terminal 150. Therefore, even if a welded portion between the upper portion of the second electrode terminal 150 and the second terminal plate 175 is cut, the second electrode terminal 150 and the second terminal plate 175 may be electrically connected to each other. That is, a welded portion between the second electrode terminal 150 and the second terminal plate 175 may not operate as a fuse part.

The first insulation member 176, positioned between the first terminal plate 174 and the cap plate 171, may insulate the first terminal plate 174 and the cap plate 171 from each other. In addition, the first insulation member 176 coupled to the upper portion of the cap plate 171 may insulate the first electrode terminal 140 and the cap plate 171 from each other. In an embodiment, the first insulation member 176 includes the upwardly protruding coupling protrusion 176a. The coupling protrusion 176a engaged with the coupling groove 174c of the first terminal plate 174 may improve mechanical coupling strength between the first terminal plate 174 and the first insulation member 176 and may prevent or substantially prevent the first terminal plate 174 from rotating. In an embodiment, the first insulation member 176 may be made of an insulating material having high rigidity so as not to be distorted and/or ruptured against a force applied when the terminal pillar 141 is riveted. The first insulation member 176 may be made of, for example, polyether ether ketone (PEEK). In an embodiment, the first insulation member 176 may have a rupture strength of approximately 1000 kg/cm$^2$.

The second insulation member 177, positioned between the second terminal plate 175 and the cap plate 171, may insulate the second terminal plate 175 and the cap plate 171 from each other. In addition, the second insulation member 177 coupled to the upper portion of the cap plate 171 may insulate the second electrode terminal 150 and the cap plate 171 from each other.

Figure 4B:
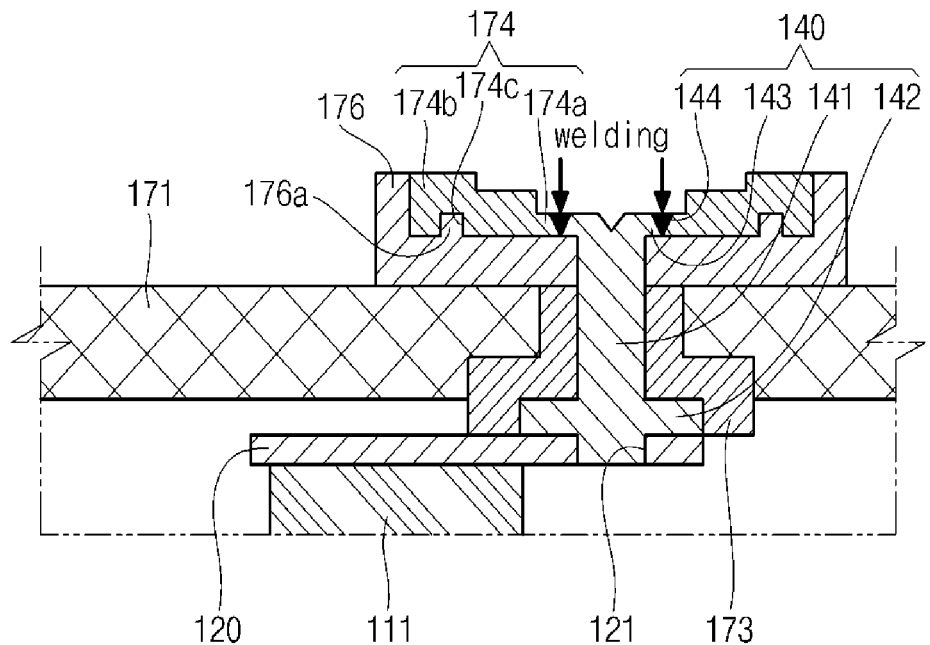
Figure 4C:
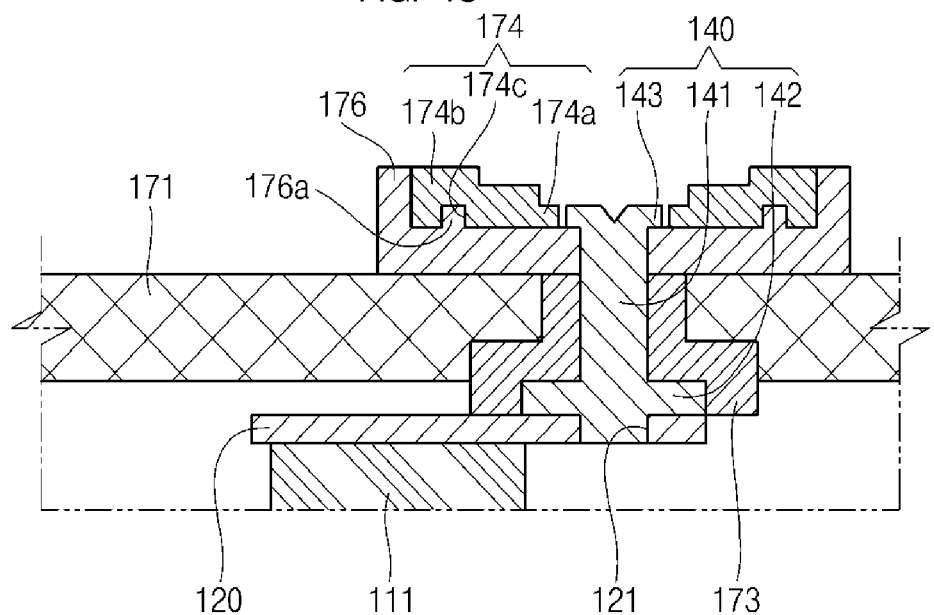

FIGS. 4A to 4C are cross-sectional views illustrating processes for preparing and operating a fuse part.

The processes for preparing and operating the fuse part will be described with reference to FIGS. 4A to 4C.

As shown in FIG. 4A, the first electrode terminal 140 is inserted into the cap plate 171 to allow the terminal pillar 141 to protrude to the upper portion of the cap plate 171. Here, the gasket 173 and the first insulation member 176 are inserted between the cap plate 171 and the first electrode terminal 140. In further detail, the gasket 173 is inserted between the first electrode terminal 140 and the cap plate 171 from the lower portion of the cap plate 171, and the first insulation member 176 is coupled to the upper portion of the first electrode terminal 140 from the upper portion of the cap plate 171. In addition, the first terminal plate 174 is coupled to the upper portion of the first electrode terminal 140. Then, the upper portion of the terminal pillar 141 is riveted to fix the first electrode terminal 140 to the cap plate 171. Here, as a result of the riveting, a top end of the terminal pillar 141 is extended to the upper portion of the first insulation member 176 to form the extension part 143. In addition, the first insulation member 176 may be made of an insulating material having high rigidity so as not to be distorted and/or ruptured against a force applied when the terminal pillar 141 is riveted. The first insulation member 176 may be made of, for example, polyether ether ketone (PEEK).

Next, as shown in FIG. 4B, boundary surfaces of the extension part 143 of the first electrode terminal 140 and the first terminal plate 174 are welded to form the fuse part 144. In further detail, the fuse part 144 is formed by welding the extension part 143 of the first electrode terminal 140 and the first area 174a of the first terminal plate 174. Accordingly, the first electrode terminal 140 is electrically connected to the first terminal plate 174.

Next, as shown in FIG. 4C, if an external short circuit occurs to the secondary battery, the fuse part 144 is melted and cut. Therefore, the extension part 143 and the first area 174a of the first terminal plate 174 are spaced apart from each other, and an electrical connection between the first electrode terminal 140 and the first terminal plate 174 is broken. In addition, since an electrical connection between an external circuit and the secondary battery 100 is also broken, the secondary battery 100 can avoid a danger of explosion or fire due to the external short circuit.

Figure 5:
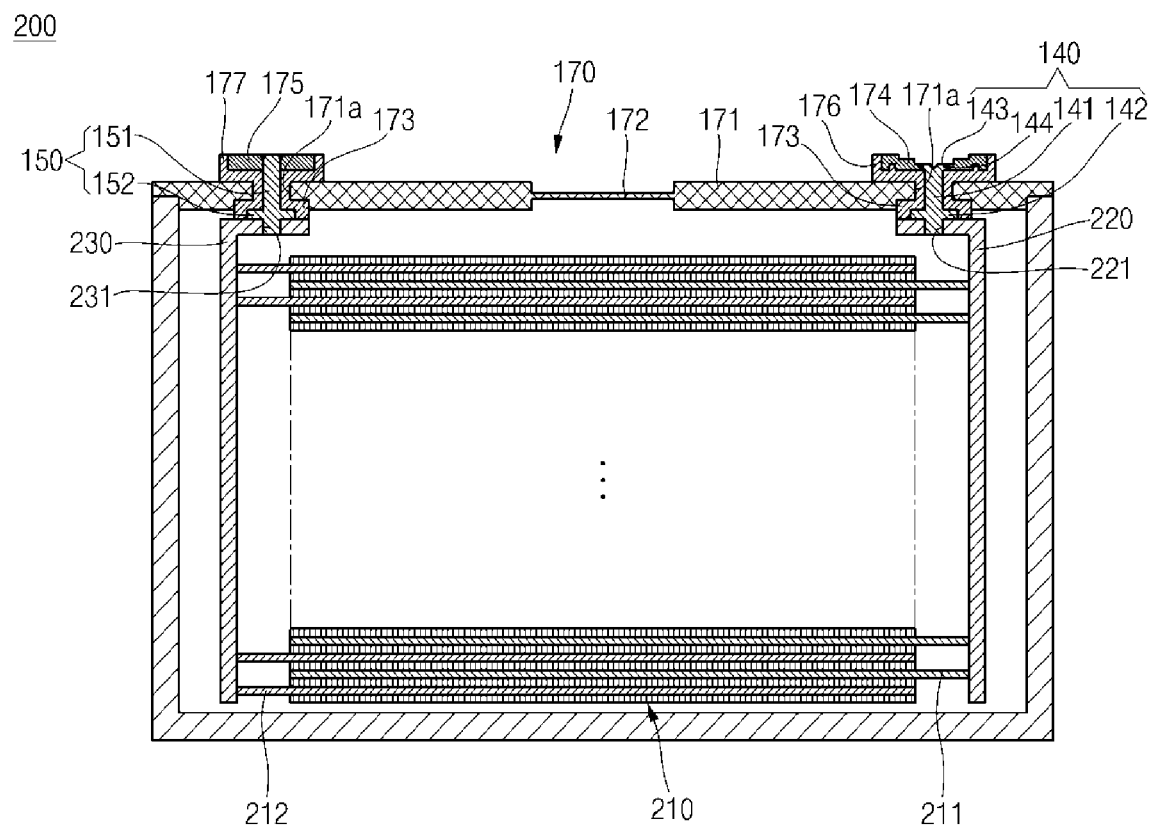
FIG. 5 is a cross-sectional view of a secondary battery according to another embodiment of the present invention.

FIG. 5 is a cross-sectional view of a secondary battery according to another embodiment of the present invention.

Referring to FIG. 5, a secondary battery 200 according to another embodiment of the present invention includes an electrode assembly 210, a first collector plate 220, a second collector plate 230, a first electrode terminal 140, a second electrode terminal 150, a case 160, and a cap assembly 170. The secondary battery 200 shown in FIG. 5 is similar to the secondary battery 100 shown in FIG. 2. However, the secondary battery 200 shown in FIG. 5 is different from the secondary battery 100 shown in FIG. 2 in that first and second electrode uncoated portions 211 and 212 protrude at lateral surfaces of the electrode assembly 210, and first and second collector plates 220 and 230 are different from the first and second collector plates 120 and 130 shown in FIG. 2. Therefore, the following description will focus on differences between the secondary battery 200 shown in FIG. 5 and the secondary battery 100 shown in FIG. 2.

In an embodiment, the electrode assembly 210 may be formed by winding a stacked structure including a first electrode plate, a separator, and a second electrode plate, which are shaped of thin plates or layers. In an embodiment, the electrode assembly 210 may be formed by stacking multiple stacked structures, each including a first electrode plate, a separator, and a second electrode plate.

The first electrode plate is formed by coating a first electrode active material, such as a transition metal oxide, on a first electrode collector made of a metal foil, such as aluminum, and includes the first electrode uncoated portion 211 on which the first electrode active material is not coated. In addition, the first electrode uncoated portion 211 may protrude to a side of the electrode assembly 210.

The second electrode plate is formed by coating a second electrode active material, such as graphite or carbon, on a second electrode collector made of a metal foil, such as copper or nickel, and includes a second electrode uncoated portion 212 on which the second electrode active material is not coated. In addition, the second electrode uncoated portion 212 may protrude to another side of the electrode assembly 210.

The separator, positioned between the first and second electrodes, prevents or substantially prevents an electrical short circuit therebetween and allows movement of lithium ions. In an embodiment, the separator may be made of polyethylene, polypropylene, or a composite film of polyethylene and polypropylene.

In addition, the electrode assembly 210 is substantially accommodated in the case 160 with an electrolyte. In an embodiment, at least one or more electrode assemblies 210 may be accommodated in the case 160. In addition, the first electrode uncoated portion 211 and the second electrode uncoated portion 212 are electrically connected to the first collector plate 220 and the second collector plate 230, respectively.

The first collector plate 220 extends from a side surface to a top surface of the electrode assembly 210 and is electrically connected to the first electrode uncoated portion 211 and the first electrode terminal 140. In further detail, the first electrode uncoated portion 211 is connected to the first collector plate 220 positioned on the side surface of the electrode assembly 210, and the first electrode terminal 140 is connected to the first collector plate 220 positioned over the top surface of the electrode assembly 210. In an embodiment, a through hole 221 is formed in the first collector plate 220 and engaged with the first electrode terminal 140 to then be fixed by welding.

The second collector plate 230 extends from a side surface to the top surface of the electrode assembly 210 and is electrically connected to the second electrode uncoated portion 212 and the second electrode terminal 150. In further detail, the second electrode uncoated portion 212 is connected to the second collector plate 230 positioned on the side surface of the electrode assembly 210, and the second electrode terminal 150 is connected to the second collector plate 230 positioned over the top surface of the electrode assembly 210. In an embodiment, a through hole 231 is formed in the second collector plate 230 and engaged with the second electrode terminal 150 to then be fixed by welding.

Figure 6:
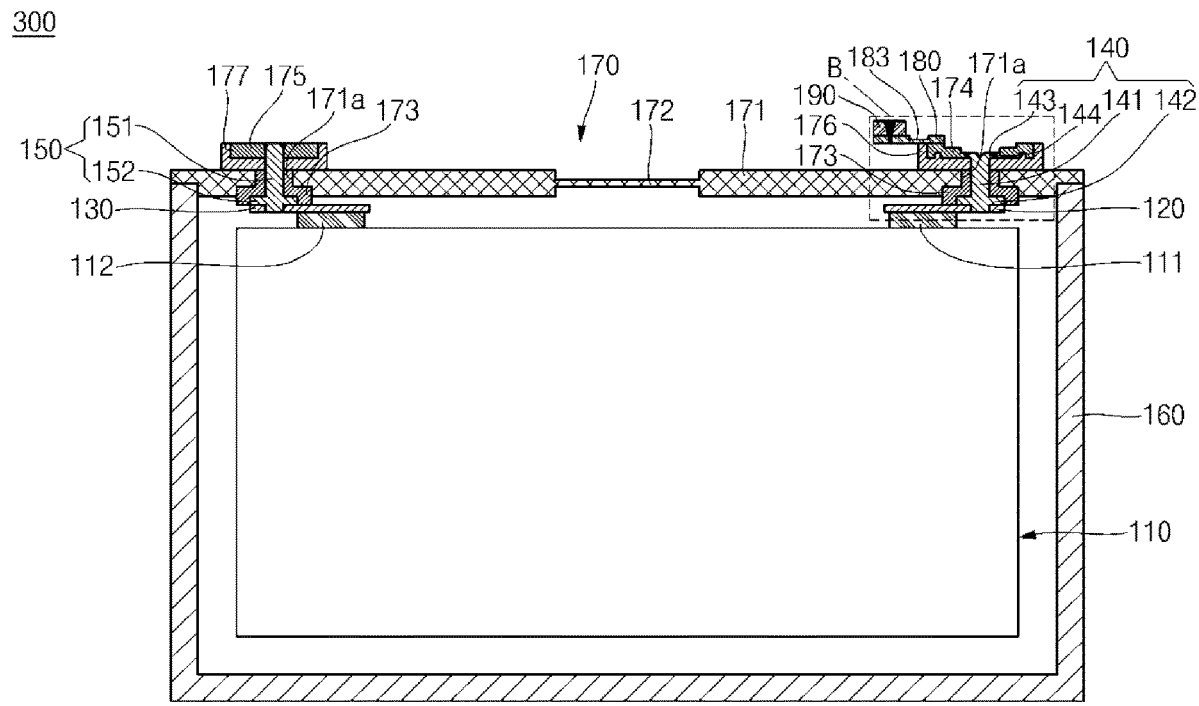
FIG. 6 is a cross-sectional view of a secondary battery according to another embodiment of the present invention.
Figure 7:
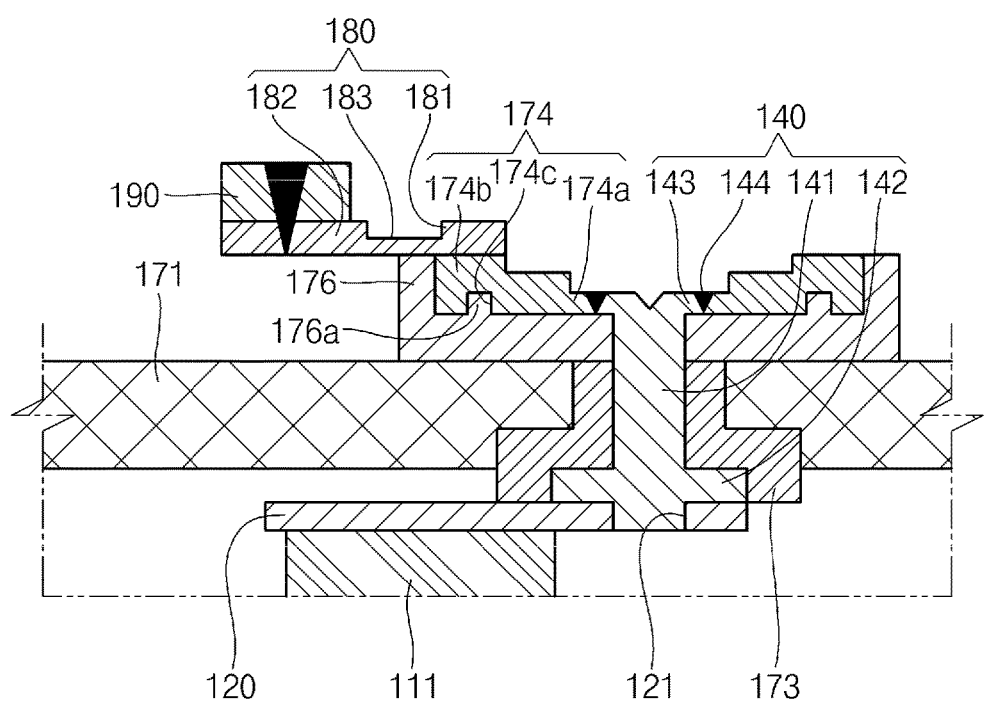
FIG. 7 is an enlarged view of a region "B" shown in FIG. 6.

FIG. 6 is a cross-sectional view of a secondary battery according to another embodiment of the present invention; and FIG. 7 is an enlarged view of a region "B" shown in FIG. 6.

Referring to FIGS. 6 and 7, a secondary battery 300 according to another embodiment of the present invention includes an electrode assembly 110, a first collector plate 120, a second collector plate 130, a first electrode terminal 140, a second electrode terminal 150, a case 160, a cap assembly 170, a connection plate 180, and a bus bar 190. The secondary battery 300 shown in FIG. 6 further includes the connection plate 180 and the bus bar 190, unlike the secondary battery 100 shown in FIG. 2.

The connection plate 180 includes a terminal connection portion 181 connected to an upper portion of a second area 174*b* of the first terminal plate 174, a bus bar connection portion 182 extending to an exterior side of the first terminal plate 174 to be connected to the bus bar 190, and a vent portion 183 located between the terminal connection portion 181 and the bus bar connection portion 182. The terminal connection portion 181 may be welded to the first terminal plate 174 or may be integrally formed with the first terminal plate 174. Therefore, the connection plate 180 is electrically connected to the first terminal plate 174 and electrically connects the first electrode terminal 140 with the bus bar 190. In addition, the vent portion 183 is located between the terminal connection portion 181 and the bus bar connection portion 182 and is positioned on a top portion of a first insulation member 176. In addition, since the vent portion 183 has a smaller thickness than the terminal connection portion 181 and the bus bar connection portion 182, it may be ruptured when an external short circuit occurs, thereby functioning as a fuse. That is, the secondary battery 300 according to another embodiment of the present invention can avoid a probable danger of explosion or fire due to the external short circuit due to the fuse part 144 and the vent portion 183.

In an embodiment, the bus bar 190 is connected to the bus bar connection portion 182 of the connection plate 180 by welding. The bus bar 190 may connect multiple secondary batteries in series or in parallel to form a battery pack. In addition, the bus bar 190 may electrically connect the secondary battery 300 to an external circuit.

While the secondary battery of the present invention has been particularly shown and described with reference to some example embodiments thereof, it will be understood by those of ordinary skill in the art that various changes in form and details may be made therein without departing from the spirit and scope of the present invention as set forth by the following claims.

What is claimed is:

1. A secondary battery comprising:
    an electrode assembly;
    a case accommodating the electrode assembly;
    a cap plate coupled to a top portion of the case;
    an electrode terminal electrically connected to the electrode assembly and comprising a terminal pillar passing through the cap plate, and an extension part extending horizontally from a top end of the terminal pillar;
    a terminal plate electrically connected to the electrode terminal;
    an insulation member between the terminal plate and the cap plate, the extension part extending horizontally from the top end of the terminal pillar to an upper portion of the insulation member; and
    a fuse part configured to be melted and cut due to a short circuit of the secondary battery, the fuse part being formed where a boundary surface of the extension part and a boundary surface of the terminal plate are welded to each other and located on the insulation member,
    wherein the insulation member comprises a coupling protrusion engaged with a coupling groove of the terminal plate.

2. The secondary battery of claim 1, wherein the terminal plate comprises: a first area located at a center of the terminal plate and welded to the extension part; and a second area located outside of the first area and having a thickness greater than a thickness of the first area.

3. The secondary battery of claim 2, wherein the thickness of the first area is the same as a thickness of the extension part.

4. The secondary battery of claim 2, wherein the first area has a hole through which the electrode terminal passes, and a width of the hole is the same as a width of the extension part.

5. The secondary battery of claim 1, wherein a portion of the terminal pillar, which protrudes to an upper portion of the cap plate, contacts the insulation member.

6. The secondary battery of claim 1, further comprising a gasket coupled between the terminal pillar and the cap plate under the cap plate.

7. The secondary battery of claim 2, further comprising:
    a connection plate electrically connected to the terminal plate; and
    a bus bar electrically connected to the connection plate.

8. The secondary battery of claim 7, wherein the connection plate comprises:
    a terminal connection portion electrically connected to the second area;
    a bus bar connection portion electrically connected to the bus bar; and
    a vent portion between the terminal connection portion and the bus bar connection portion.

9. The secondary battery of claim 8, wherein the vent portion is on the insulation member.

* * * * *